Feb. 20, 1945.   E. A. BIGARANI ET AL   2,369,645
WORK FIXTURE
Filed July 5, 1943   2 Sheets-Sheet 1
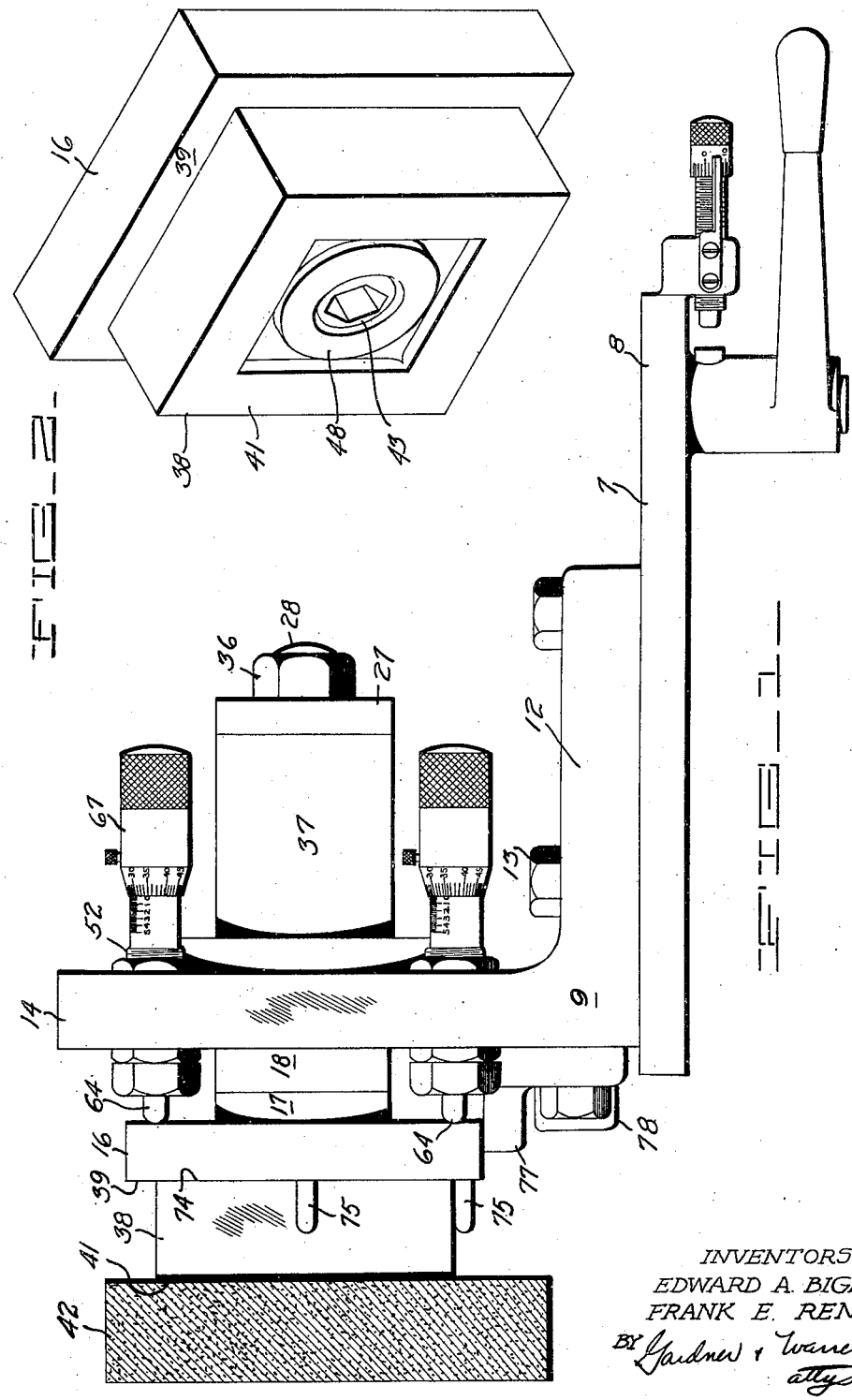
INVENTORS
EDWARD A. BIGARANI
FRANK E. RENICK
BY Gardner & Warren
attys.

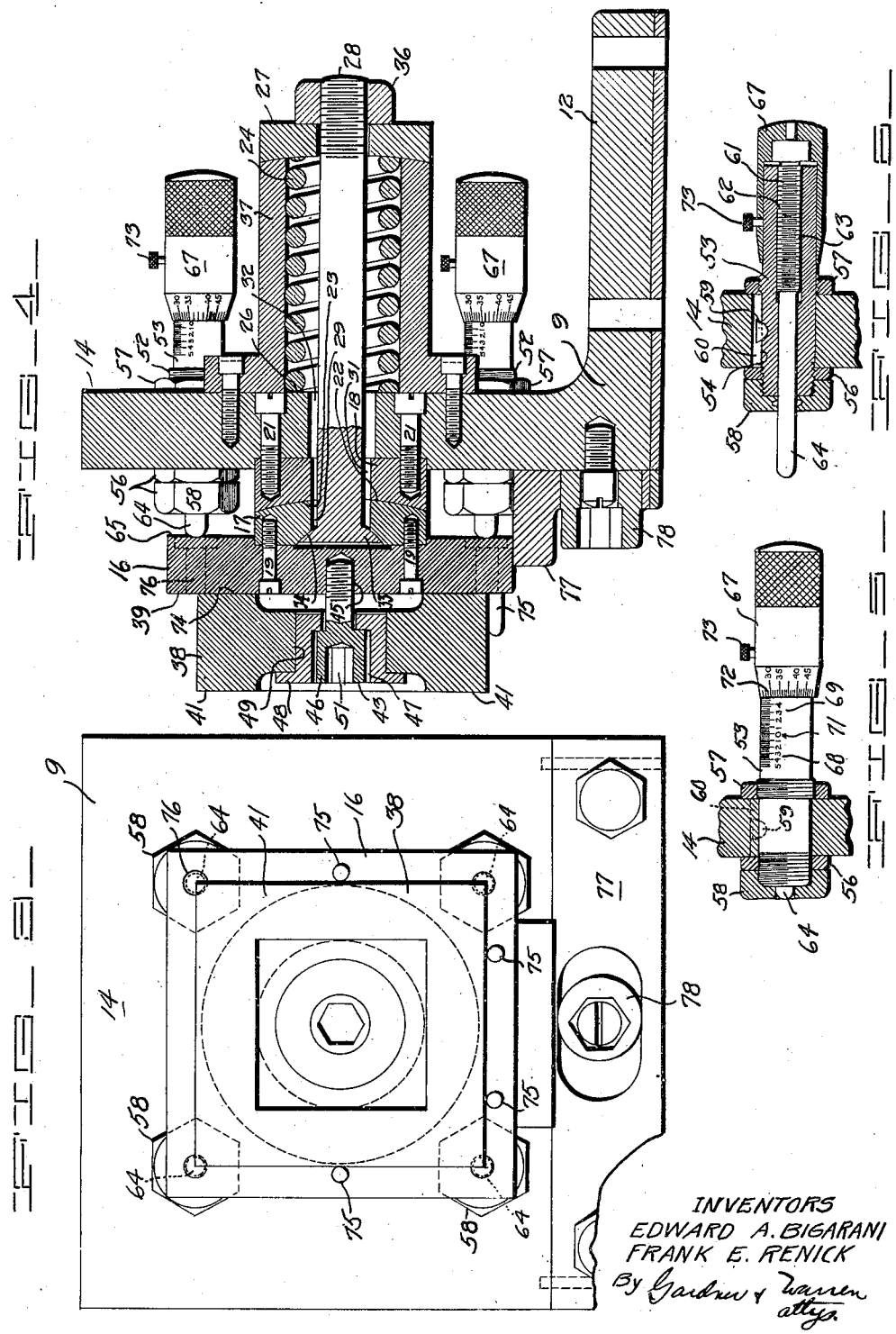

Patented Feb. 20, 1945

2,369,645

UNITED STATES PATENT OFFICE 2,369,645

WORK FIXTURE

Edward A. Bigarani, San Francisco, and Frank E. Renick, Berkeley, Calif.

Application July 5, 1943, Serial No. 493,590

5 Claims. (Cl. 51—217)

The invention relates to a fixture designed for use in placing and retaining a piece of work such as a wedge, chock, or other spacing block or member, on a grinder or other apparatus for machining the piece of work to a predetermined size and form.

In aligning heavy machines or apparatus having connected rotating or other moving parts, such as in the case of engines and propeller shafts on ships, extreme accuracy is required as even a slight misalignment will frequently result in fatal damage to vital parts. It is the generally accepted practice in arranging for the support of the engine and shaft to first effect a temporary support and alignment by the use of a series of jack-bolts between the engine bed and its support and between the bearings of the shaft and the support therefor. When proper alignment is effected in this manner, readings are taken of the proper spacing at a suitable member of points so that permanent spacing members may be inserted and positioned thereat. When the permanent members are in position, the parts are bolted or otherwise secured in place. These members are usually in the form of heavy square metal blocks called chocks, and the readings are made so as to furnish the thickness required at the four corners of the chocks. The chocks are trimmed or machined to shape in accordance with the readings, and heretofore this operation was accomplished in a lathe or milling machine, the chocks being mounted by clamping them in position with wedges, shims, etc. Since quite frequently the chocks must be machined or trimmed to provide multiple or composite angular surfaces thereon, a comparatively difficult and extremely laborious setting up operation was involved and in fact so much so that even with a skilled mechanic performing the setting up and machining operations, an undue and exasperating delay was invariably incurred by such operations before the task of aligning the units could be completed. One of the drawbacks of the previous setting up method was that the chock itself was utilized as a cooperating part of the assembly and furthermore many loose parts had to be assembled and held together and then disassembled on completion of the machining operation. In accordance with our invention, and as an important object thereof, the means setting up the chock in proper position and adjustment for the machining or trimming operation, is independent of the chock and involves only parts in operatively permanent association.

Another object of the invention is to provide a means of the character described, which will permit the machining or trimming operation on the chock to be performed with a grinder.

A further object of the invention is to provide a means of the character described which will insure the retention of the chock in proper position throughout the entire machining or trimming operation.

A still further object of the invention is to provide a means of the character described, which will afford a wide range of adjustment in the positioning of the chock, permits an almost infinitesimal degree of adjustment, and will not subject the adjustment means to undue strain.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of the fixture of our invention with a chock positioned thereon and mounted on a grinding table.

Figure 2 is a perspective view of the holding plate for the chock, with a chock mounted thereon.

Figure 3 is an end elevation of the fixture as shown in Figure 1.

Figure 4 is a vertical sectional view of the fixture taken on the line 4—4 of Figure 3.

Figure 5 is a side elevation of one of the micrometers as mounted on the fixture.

Figure 6 is a longitudinal section view through the micrometer as shown in Figure 5 but in a different adjusted position.

The fixture of our invention is applicable for use in any machine, such as a lathe, grinder, milling machine, etc., but in the present embodiment the fixture is illustrated as applied to a grinder 7 having a table 8 upon which the fixture is mounted. As here shown the fixture comprises a supporting plate 9 having a section 12 which is arranged for attachment to the table 8 such as by means of bolts 13, and a section 14 angularly related to the section 12 and upon which most of the fixture parts are mounted.

Positioned at one side of the section 14 and supported on such section is a face plate 16 here shown generally parallel to the section 14. The face plate is designed for universal adjustment relative to the supporting plate 9 and is formed with a swivel pad 17 engaging a swivel pad 18 on the section 14, the pads being here shown secured to the respective plates by means of screws 19 and 21. The pads 17 and 18 are formed with coengaging segmental spherical bearing surfaces 22 and 23 respectively, the bearing surface 22 being here shown convex while the surface 23 is complementary concave. The surfaces 22 and 23 are maintained in engagement by means of a spring 24 which is interposed between a shoulder 26 on the section 14 and a collar 27 mounted on a locking bolt 28, the latter extending through aligned openings 29 and 31 in the swivel pads and an opening 32 in the section 14, and having a head 33 seated in depression 34 in pad 17. The frictional pressure between the engaging faces 22 and 23 may be varied by rotating a nut 36 which is threaded to the bolt and abuts the collar 7. Preferably a tubular housing 37 secured to the section 14 and extending therebetween the collar 27, encloses the spring and the portion of the bolt surrounded thereby.

As will be clear from Figure 4, the work to be operated upon, such as the chock 38 here illustrated, is designed to be secured and held against a side 39 of plate 16, and means are provided for adjusting the position of such plate relative to the supporting plate 9 and thus the table 8, so that the exposed side 41 of the chock, will be appropriately presented to the grinding wheel 42 of the grinder, for removing the correct amount of material and leaving a surface of the required angle. Attachment of the chock to the face plate is here shown arranged to be effected by means of a screw 43 threaded for engagement in a tapped hole 45 of the plate. The head 46 of the screw 43 is arranged to seat in a recess 47 formed in an adapter 48 fitting in the chock opening 49, rotation of the screw being effected by inserting a tool in a socket 51 in the head.

The means aforesaid for adjusting the angular positioning of the face plate, includes a plurality of adjusting members 52 mounted on the section 14 of supporting plate 9. The members 52 are preferably in the form of micrometers positioned on the section with their spindle axes in parallel relation and arranged for movement perpendicular to the section. As here shown, a micrometer is provided for each corner of the chock, and since the present chock is rectangular, four micrometers are utilized. Each micrometer as illustrated in Figure 6 comprises a liner 53 extending through a hole 54 in the section and held in position against axial displacement by means of nuts 56 and 57 engaging the opposite sides of the section. A dust-proof cap 58 preferably covers the end of the liner adjacent the face plate, and rotation of the liner is prevented by a key 59 fixed on the liner and engaging in a keyway 60 at the side of the hole 54. Within the liner is a screw-threaded spindle 61, the threads 62 of which engage with the internal threaded portion 63 of the liner. One end 64 of the spindle projects from the liner to engage one side 65 of the face plate while the other end 66 projects from the opposite end of the liner and is fixed for rotation and longitudinal movement with an exteriorly knurled thimble 67 mounted on the liner. The liner is formed with measuring unit graduations 68 and 69 at opposite sides of a zero or neutral point 71, the graduations indicating increased measurements in opposite longitudinal directions. Measurement graduations 72 are also provided on the thimble but extending circumferentially thereof and arranged in juxtaposition to the graduations on the liner so that very fine adjustments in the positioning of the spindle may be made and indicated. The spindle may be held fixed in any desired position of adjustment by means of a set screw 73 mounted on the thimble.

As heretofore explained, the measurements furnished for finishing the chock are those of the thickness of the chock at the corners, and it is important, at least for the present embodiment of the invention, that the micrometers be arranged on the supporting plate so that the axes of the spindles will intersect the corners of the chock when the latter is operatively held on the face plate. As will be understood, the axes of the spindles are in parallel relation and the micrometers are so arranged that when all the thimbles give an absolute zero reading, each of the ends 64 of the spindles will define a plane with respect to which all of the spindle axes are in absolute perpendicular relation. In this connection it will be noted the mounting and positioning of the face plate in relation to the micrometers is such that when the ends 64 of the spindles are positioned as aforesaid, the sides 65 of the plate will be in contact with each of the spindles and thus held in perpendicular relation with the spindle axes. The sides 39 and 65 of the face plate are parallel, and therefore when the chock is operatively held against the plate, the chock side 74 in contact with the plate, will of course be at all times in the same angular relation to the spindles as is the plate side 65 designed to contact directly with the spindles.

It will be understood that in the present embodiment of the invention, the micrometers are designed not only for indicating the angle or angles at which the chock should be positioned or held in the machine in order to be trimmed to the proper thickness and shape, but to actually move the face plate to and hold it in place for such positioning of the chock, and in this connection, attention is directed to the fact that the ends 64 of the spindles are rounded to provide a more or less point contact with the plate, and the plate is provided with hardened inlays 76 at the area arranged for contact with the spindles. To assist in holding the face plate against rotational displacement on the supporting member and in proper relationship with the micrometers, a bracket 77 is mounted on the member for movement to and from and engagement with a side edge of the plate. By means of a cam 78 the bracket is moved against the plate to lightly engage same and to square and hold it in place.

The chock may be attached to the face plate either initially or at any time before the trimming or grinding is commenced. However as before explained the chock must be positioned on the plate with the corners in registration with the spindle axes that is when the micrometers are at the neutral or zero point, and incidentally suitable gauge pins 75 are preferably provided on the side 39 of the plate so as to readily permit the retention and proper positioning of the chock on the plate without the necessity of placing the face plate in any particular position therefor.

Independently of the chock attaching operation, the setting operation of the fixture is as follows:

Assuming that each of the micrometers reads zero, that is, each of the spindles are in contact with and the spindle axes are perpendicular to the plate side 65, the thimbles of the micrometers are rotated to retract or advance the individual spindles as may be required, care being taken precedent to such operation to retract the nut 36 so that only the spring 24 will resist the movement of the surfaces 22 and 23 over each other. In this connection it will be noted that clearance is provided between the collar 27 and housing 37 to permit free movement of the locking bolt 28, and preferably the opposing surfaces of the collar and housing and of the head 33 and the depression 34 are curved in correspondence with surfaces 22 and 23. In adjusting the plate, one-half of the difference in the required reduction in the thickness of the chock at a pair of opposite corners, is effected by each of the micrometers. For example if the difference in thickness at the top and bottom of at least one edge of the chock is to .0010 of an inch the operator will retract both micrometers .0005 at the top or bottom as the case may be and then or simultaneously advance the other micrometers a like .0005. Where there is also a variation in the thickness between the corners at opposite side edges, the micrometers at the right or left as the case may be are then correspondingly retracted and advanced. The micrometers are then locked in position by the set screws 73, and the plate is now in position to hold the chock for trimming to the required size and form, and while the plate is thus positioned and held by each of the micrometers, the nut 36 is rotated by the operator to clamp the collar 27 against the housing 37 so that the plate will be completely locked against further movement. It is important to note that when the setting is thus completed and the surfaces 22 and 23 locked by the nut 36 against any relative movement, the entire strain of holding the plate and the chock in final position and against displacement such as during the trimming operation, is borne exclusively by the swivel pads 17 and 18, and no strain whatever imposed on the micrometers. With the chock thus held, the grinding wheel or other tool may be advanced against the side 41 of the chock to perform the trimming operation.

We claim:

1. A fixture for holding a multi-cornered piece of work, comprising a supporting member, a work holder plate mounted opposite said member for universal pivotal movement relative thereto, means to position the work on the plate with each of the corners equidistant from pivotal center of said plate a plurality of pairs of micrometers mounted on said member and positioned to register with said corners and engage said plate to move it about said universal mounting, means independent of said micrometers for holding said plate and member against relative movement, and means on said member independent of said latter means and of said micrometers for holding the plate against rotational displacement relative to the micrometers.

2. A fixture for holding a multi-cornered piece of work, comprising a supporting member, a work holder plate mounted opposite said member for universal pivotal movement relative thereto, a plurality of pairs of micrometers mounted in a transversely offset relation on said member and in general perpendicular relation to said plate, said micrometers having spindles movable to and from said plate and arranged to engage a side thereof at points substantially aligned with the corners of the work and equidistant from the axis of movement of the plate, guide means to position the work on the opposite side of the plate with the corners of the work in alignment with the points aforesaid on the plates, and means to clamp the plate and member against relative movement.

3. A work holder fixture comprising a support, a work holder plate arranged in generally parallel relation opposite said support and having its opposite sides parallel to each other, a universal connection between said plate and support including complementary spherical segments secured to the plate and support and interposed therebetween, a stud having a universal connection with the segment connected to the plate and extending freely through an opening in the other segment and outwardly therefrom, an abutment member mounted on said stud on the portion extending outwardly from the support, a nut having a threaded connection with said stud outwardly of said abutment member and operative to move said abutment member longitudinally of said stud, a spring interposed between said abutment member and support, a housing fixed to said support and enclosing said spring and engageable by said abutment member to hold said segments against relative movement, a slide mounted on said support and engageable with said plate to position same in predetermined relation to said support and against substantial rotational displacement relative thereto, means to secure the work on the other side of said plate and to hold same in predetermined position thereon and against relative rotated displacement, and means mounted on said support for adjusting the position of said plate relative to said support and including a plurality of micrometers having spindles in parallel relation and positioned to move to and from said plate and to engage and move said plate as controlled by said connection, said spindles positioned to engage said plate at points equidistant from the center of movement of said connection, each of said micrometers having indicated thereon a point of adjustment at which axis of the spindle will be perpendicular to said side of the plate when the spindle is engaged therewith, and each of said micrometers having measurement unit graduations extending progressively oppositely from said adjustment point to indicate corresponding positioning of the spindle forwardly or rearwardly of said point, and means on each of the micrometers for locking the spindle in adjusted position.

4. A work holder fixture comprising a support, a work holder plate opposite said support, a means of universal connection between said plate and support, plate adjusting means mounted on said support including a plurality of micrometers having spindles movable to and from said plate and arranged for engagement with the adjacent side thereof to effect movement of the plate about said connection, the points of engagement between said spindles and plate being equidistant from the center of movement of said connection, each of said micrometers having indicated thereon the point of adjustment at which the axis of the spindle will be perpendicular to said side of the plate when the spindle is engaged therewith, and each of said micrometers having measurement unit graduations extending progressively from said point, and means independent of said micrometer spindles for holding said plate against movement relative to said support.

5. A work holder fixture comprising a support, a work holder plate opposite said support, a means of universal connection between said plate and support, plate adjusting means mounted on said support including a plurality of micrometers having spindles movable to and from said plate and arranged for engagement with the adjacent side thereof to effect movement of the plate about said connection, the points of engagement between said spindles and plate being equidistant from the center of movement of said connection, each of said micrometers having indicated thereon the point of adjustment at which the axis of the spindle will be perpendicular to said side of the plate when the spindle is engaged therewith, and each of said micrometers having measurement unit graduations extending progressively oppositely from said adjustment point to indicate corresponding positoning of the spindle forwardly or rearwardly of said point.

EDWARD A. BIGARANI.
FRANK E. RENICK.